(12) United States Patent
Gaster et al.

(10) Patent No.: US 11,231,962 B2
(45) Date of Patent: Jan. 25, 2022

(54) HETEROGENEOUS PARALLEL PRIMITIVES PROGRAMMING MODEL

(71) Applicant: Advanced Micro Devices, Inc., Sunnyvale, CA (US)

(72) Inventors: Benedict R. Gaster, Sunnyvale, CA (US); Lee W. Howes, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 390 days.

(21) Appl. No.: 15/797,702

(22) Filed: Oct. 30, 2017

(65) Prior Publication Data
US 2018/0060124 A1 Mar. 1, 2018

Related U.S. Application Data

(63) Continuation of application No. 13/904,791, filed on May 29, 2013, now abandoned.

(60) Provisional application No. 61/652,772, filed on May 29, 2012.

(51) Int. Cl.
*G06F 9/50* (2006.01)

(52) U.S. Cl.
CPC .............. *G06F 9/50* (2013.01); *G06F 9/5072* (2013.01)

(58) Field of Classification Search
CPC ....... G06F 9/50; G06F 9/5072; G06F 12/0223
See application file for complete search history.

(56) References Cited

U.S. PATENT DOCUMENTS

| | | | |
|---|---|---|---|
| 5,999,987 A | 12/1999 | O'Farrell et al. | |
| 6,182,154 B1 | 1/2001 | Campagnoni et al. | |
| 6,681,388 B1* | 1/2004 | Sato | G06F 8/453 717/149 |
| 8,381,203 B1 | 2/2013 | Beylin et al. | |
| 8,635,626 B2* | 1/2014 | Jula | G06F 9/5088 718/105 |
| 2008/0196030 A1* | 8/2008 | Buros | G06F 9/5033 718/102 |
| 2008/0282064 A1 | 11/2008 | Day et al. | |
| 2009/0153897 A1* | 6/2009 | Blackmore | G06F 12/1036 358/1.15 |
| 2009/0259996 A1 | 10/2009 | Grover et al. | |
| 2010/0287279 A1* | 11/2010 | Vaidyanathan | G06F 9/5066 709/226 |
| 2011/0161944 A1* | 6/2011 | Cho | G06F 8/433 717/149 |
| 2011/0246960 A1 | 10/2011 | Kleingon | |
| 2012/0054770 A1 | 3/2012 | Krishnamurthy et al. | |
| 2012/0139926 A1* | 6/2012 | Clohset | G06T 15/005 345/502 |

* cited by examiner

*Primary Examiner* — Theodore C Parsons
*Assistant Examiner* — Bruce S Ashley
(74) *Attorney, Agent, or Firm* — Volpe Koenig

(57) ABSTRACT

With the success of programming models such as OpenCL and CUDA, heterogeneous computing platforms are becoming mainstream. However, these heterogeneous systems are low-level, not composable, and their behavior is often implementation defined even for standardized programming models. In contrast, the method and system embodiments for the heterogeneous parallel primitives (HPP) programming model disclosed herein provide a flexible and composable programming platform that guarantees behavior even in the case of developing high-performance code.

16 Claims, 3 Drawing Sheets

HETEROGENEOUS PARALLEL PRIMITIVES PROGRAMMING MODEL

CROSS REFERENCE TO RELATED APPLICATIONS

This application is a continuation of U.S. patent application Ser. No. 13/904,791, filed May 29, 2013, which claims the benefit of U.S. Provisional Application No. 61/652,772 and filed May 29, 2012, which are incorporated by reference as if fully set forth.

FIELD OF INVENTION

The present invention relates generally to a programming model for a heterogeneous processor system.

BACKGROUND

With the success of programming models such as OpenCL and CUDA, heterogeneous computing platforms are becoming mainstream. However, these heterogeneous systems are low-level, not composable, and their behavior is often implementation defined even for standardized programming models.

Thus what is needed are system and method for a heterogeneous parallel primitives (HPP) programming model that provides a flexible and composable programming platform that guarantees behavior even in the case of developing high-performance code.

SUMMARY

According to an embodiment, a method and system for executing an asynchronous task on a heterogeneous computing platform are provided. An asynchronous task configured to execute on a grid in initialized. An initially unknown result that becomes available during execution is encapsulated. The asynchronous task is executed on the grid. The result is assigned to the asynchronous task when the result becomes available during execution.

According to another embodiment, system for managing memory is provided. A heterogeneous parallel primitives (HPP) platform generates an unbound distributed array in a plurality of memories of different types. Once generated, the distributed array is bound to a kernel that executes a workgroup on a processor in a heterogeneous computing platform. During execution, the bound distributed array is accessed by the workgroup.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

Figure 1:
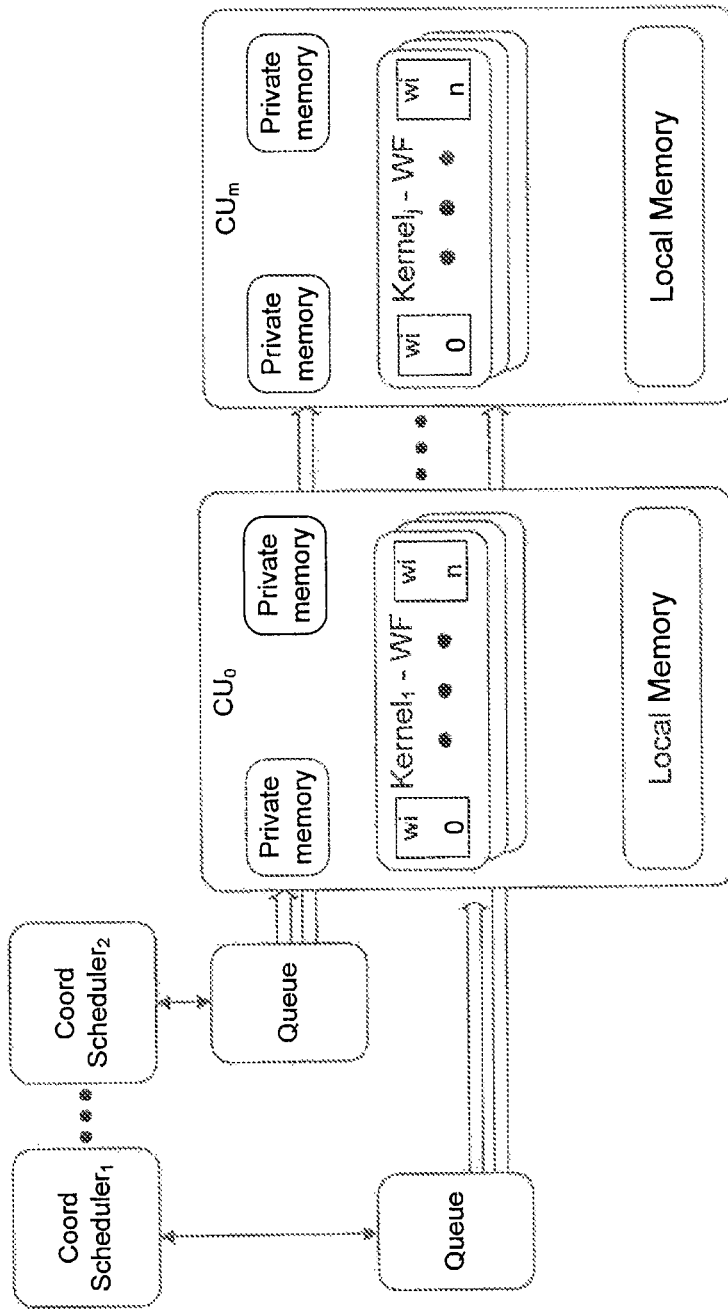
FIG. 1 is a block diagram of a heterogeneous parallel primitives execution model, according to an embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Graphics processing units (GPU) generally comprise multiple processing elements that are ideally suited for executing the same instruction on parallel data streams, as in the case of a single instruction multiple data (SIMD) device, or in data-parallel processing. In many computing models, a central processing unit (CPU) functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on the GPU. One or more of the computation cores of multi-core CPUs or GPUs can be part of the same die (e.g., AMD Fusion™) or, alternatively, in different dies (e.g., Intel Xeon™ with NVIDIA GPU). Recently, hybrid cores having characteristics of both CPU and GPU (e.g., CellSPE™, Intel Larrabee™) have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas.

Several programming models have been developed for heterogeneous computing platforms that have CPUs and GPUs. These programming models include BrookGPU by Stanford University, the compute unified device architecture (CUDA) by NVIDIA, and OpenCL by an industry consortium named Khronos Group. The OpenCL framework offers a C-like development environment which users can create applications for the GPU. OpenCL enables the user, for example, to specify instructions for offloading some computations, such as data-parallel computations, to a GPU. OpenCL also provides a compiler and a runtime environment in which code can be compiled and executed within a heterogeneous, or other, computing system.

Heterogeneous computing platforms can include multiple CPUs and GPUs. For performance reasons CPUs and GPUs in a heterogeneous computing platform are designed differently and perform different functions. For example, GPUs support wide vectors and substantial register files to optimize throughput computing goals. CPUs are optimized for latency, dedicating logic to caches and out-of-order dependence control.

Because of those different functions, heterogeneous computing platforms are difficult to develop efficiently. Particularly, given different functions of CPU and GPU cores, a difficulty arises in developing an efficient programming model for the heterogeneous computing platform.

Existing programming models attempt to efficiently program the heterogeneous computing platforms using several programming models. For example, GPU programming models have expanded over recent years to higher levels of flexibility. Both OpenCL and CUDA support heterogeneous computing platforms to some degree. For example, by structuring the programming model as a data-parallel methodology with weak communication guarantees, these programming models ensure that code may execute on varied target platforms. However, conventional programming models have fundamental problems. They lack composability of operations and flexibility in the execution.

To ease the composability burden for the heterogeneous computing platform development, conventional programming models concentrate on the application program interface (API) simplifications. CUDA, for example, includes a simplified API interface compared to the previous graphics oriented programming environments. Microsoft's C++ AMP design is another example that eases composability by linking the benefits of C++ type safety with GPU programming, as do pragma-based models such as OpenACC.

Additionally, conventional programming models follow an inflexible single program multiple data ("SPMD") model. Example conventional programming models that follow SPMD are OpenGL, CUDA and other low-level GPU intermediate languages. On a GPU, those programming models execute in an SPMD-on-SIMD fashion. This technique is sometimes known as a single instruction multiple thread ("SIMT") implementation. However, the SIMD model limits the developer's ability to flexibly use the heterogeneous computing platform. For example, OpenCL's memory model does not allow any communication between work groups without the use of atomic operations. OpenCL also does not provide methods that guarantee that memory writes commit to global visibility and provides little or no control of memory ordering. In another example, CUDA offers a partial solution to this issue with a "threadfence" operation. The "threadfence" operation ensures that the workitems within a work group have completed operating on their allocated sections in memory.

The SIMD nature of execution leads to other problems. For example, in the SIMD model a workitem is mapped to an individual SIMD lane in a larger hardware thread. SIMD model then uses execution masks to switch execution between the workitem subsets when control flow diverges. No guarantees of progress can be made in the presence of dependencies between lanes. CUDA's limited hardware space allows programmers to make assumptions about how wide a hardware thread is and how many SIMD lanes are included in the hardware thread. OpenCL, on the other hand, does not allow programmers to make such an assumption.

Conventional programming models also place restrictions on the synchronization barriers. For example, restricting barriers within the divergent control flow is not necessarily a hardware limitation, but a factor of a conventional programming model. In one example, Titanium programming language by NVIDIA prohibits barriers inside any divergent control flows. In another example, SPMD implementations for modern CPUs use the notion of maximum convergence to avoid barriers in a control flow altogether. The notion of maximum convergence guarantees that when two program instances follow the same control path, the programs are guaranteed to execute each program statement concurrently.

Further, conventional programming models fail to utilize braided parallelism. Braided parallelism is a combination of data parallelism and task parallelism. Conventional programming models, such as OpenCL and CUDA implement data parallelism. However in addition to data parallelism, task parallelism can also be implemented in a heterogeneous computing platform, as described below.

For example, a game engine that implements a heterogeneous computing platform displays many types of parallelism. It includes parallel AI tasks, concurrent workitems for user interfaces, and massive data-parallel particle simulations, to name a few examples. However, even when the components in the game engine exhibit parallelism, the video engine fails to exhibit parallelism in its entirety. In fact, the entire video engine is not parallel as many of its tasks are generated dynamically.

A need for implementing task-graph executions on a GPU is shown by existence of persistent threads. Persistent threads may be used for building scheduling systems within threads and thus circumventing the hardware scheduler. This approach is commonly used to reduce overhead that arises from massively parallel data executions. Persistent threads, however, also demonstrate a need and limitation in conventional programming models for implementing braided parallelism.

Conventional heterogeneous computing platforms also lack in composability. Conventionally, workitems that process work on a GPU are divided into synchronizable work groups. Those work groups share data. One way to synchronize work groups is by using a barrier that enforces memory consistency and workitem ordering. The conventional barriers however, are defined to work across only work groups and do not enable global synchronization. As a result, conventional barriers are precluded from synchronizing workitems in most divergent control flows.

Additionally, many conventional GPGPU programming models expose distinct memory address spaces (also referred to as domains). Prior to processing data by a GPGPU, the data must be moved explicitly in and out of these domains. This poses several issues. First, when loading third-party libraries in and out of the domains, a GPU developer must be aware of the memory spaces of the library's parameters, and may be required to write additional data movement code when the library has unexpected parameters and memory requirements. Second, there is little to no way to enforce how library functions are called and over what width in a work group. This results in an assumption that libraries either execute across an entire work group or on a single workitem. When the library is being executed on the entire work group, the work group may be synchronized using barrier synchronization and share state internally. However, the conventional programming platforms do not support a library that is being executed on a single workitem and explicitly do not support such state sharing.

1. Introduction to Heterogeneous Parallel Primitives Programming Model

A heterogeneous parallel primitives (HPP) programming model is designed to solve the above described limitations of conventional heterogeneous computing platforms. HPP is a braided parallel programming model that supports task and data parallelism, and solidifies flexibility and composability concepts that have been lacking in the conventional programming models.

In an embodiment, HPP programming model may be a combination of OpenCL, C++11 and Concurrency Runtime by Microsoft. For example, HPP adopts the execution model of OpenCL and extends the OpenCL's execution model with braided parallelism, the hosting of object oriented C++11 language and a stricter and more controllable memory model. In an embodiment, HPP may be embedded into C++11 as a library and a device kernel language, that is designed to target both CPU and massively multi-threaded GPU devices.

HPP includes three components, a platform model, an execution model and a memory model.

Platform model specifies an abstract hardware model, consisting of the host processor coordinating execution and one or more compute units capable of dispatching and executing HPP kernels. To enable support for both data and task parallelism HPP evolves the device model of OpenCL from a single threaded device to a set of explicitly programmable work coordinators capable of launching units of work on the compute cores as seen in FIG. 1, according to an embodiment of the present invention.

Execution model defines how HPP programming model is configured on the host and how kernels are executed on the device. Unlike the conventional GPU programming models described above, HPP supports both data-parallelism and task-parallelism as first class execution models.

In the execution model, coordinators are single-thread scalar programs. Coordinators perform reads and writes into globally visible memory. The read and writes include atomic operations. Coordinators also perform conditional flows. The conditional flows include iteration. Additionally, coordinators dispatch kernels on the compute units.

In an embodiment, coordinators execute on the Coord Schedulers of FIG. 1.

In one example, kernels execute on compute units (CUs) and assume an explicitly parallel execution. The term "kernel", as used herein, refers to a program and/or processing logic that is executed as one or more workitems in parallel having the same code base. Each kernel describes the execution of a single lane of execution called a workitem. When coordinators dispatch a kernel, multiple workitems may execute sharing the same kernel code.

In one example, coordinators (scheduling program runs on coord1 scheduler entities, so that programs run concurrently) execute concurrently with kernels. This enables coordinators to dispatch new kernels while other kernels are concurrently executing.

In one example, workitems are organized into workgroups of size 1 or more. Collections of workitems within a workgroup are executed in lock-step as part of a vector, called an mvector (machine vector), potentially using predication. The specific length of an mvector is implementation defined and is exposed as a symbolic constant (MVECTOR SIZE).

In one example, memory model defines an abstract memory hierarchy that kernels use. The abstract memory hierarchy works regardless of the actual underlying memory architecture. Unlike the conventional GPGPU models the memory hierarchy is closer to a more traditional shared memory system. For example, scratch pad memories are not exposed explicitly.

In one example, HPP programming model also adopts the C++11 memory model for workitems communications. The code snippet in Table 1 shows an HPP application that atomically increments its input in parallel:

TABLE 1

```
#include <atomic>
void inc(atomic_int &input, int numOfTimes)
{
    parallelFor(Range<1>(numOfTimes,
    [input] (Index<1>) _device(hpp) {
    input.add(1);
    });
}
```

2. Task and Data Parallelism in a Heterogeneous Parallel Primitives Programming Model HPP programming model enables developers to introduce data and task parallelism. The example below demonstrates in pseudo code how HPP programming model enables programmers to introduce data and task parallelism. Table 2A is a function for multiplying two matrices.

TABLE 2A

```
void matixMul(
    int size,
    double * inputA,
    double * inputB,
    double * output)
{
    for (int i = 0; i < size; ++i) {
        for (int j = 0; j < size; ++j) {
            double sum = 0;
            for (int k = 0; k < size; ++k) {
                double a = inputA[i * size + k];
                double b = inputB[k * size + j];
                sum += a * b;
            }
            C[i * size + j] = sum;
        }
    }
}
```

In Table 2A, the iteration spaces of the outer two "for" loops are independent of each other. Because the "for" loops are independent of each other, they can be executed in parallel. One conventional way to parallelize the pseudo code Table 2A in a data parallel execution is to use size*size number of workitems, where each workitem executes the inner loop with a corresponding index from the 2D iteration space.

In a data programming model, the algorithm in Table 2A can be parallelized using a parallelFor function. The pseudo code for the parallelFor function is shown in Table 2B.

TABLE 2B

```
void matixMul(
    int size,
    Pointer<double> inputA,
    Pointer<double> inputB,
    Pointer<double> output)
{
    parallelFor(
    Range<2>(size, size),
```

TABLE 2B-continued

```
   [inputA,inputB,output] (
      Index<2> index) _device(hpp) {
      unsigned int i = index.getX( );
      unsigned int j = index.getY( );
      double sum = 0;
      for (unsigned int k = 0; k < size; ++k) {
         double a = inputA[i * size + k];
         double b = inputB[k * size + j];
         sum += a * b;
      }
      output[i * size + j] = sum;
   });
}
```

The implementation in Table 2B is not dissimilar from the data parallel model popularized by Open MP and the GPGPU programming models. However, unlike conventional programming models, where task parallelisms is implemented on CPUs, HPP programming model includes task parallel runtime (TPR) that supports data parallelism as a first class citizen.

Similar to popular TPRs designed specifically for the CPU, HPP programming model's tasks can be data-parallel. The difference is that in HPP programming model, tasks maintain data-parallel representations much later in the execution process and hence more efficiently map to highly data parallel architectures.

In an embodiment, the pseudo code in Table 2B is rewritten into an HPP version in Table 2C. Table 2C uses parallel tasks and a notion of the future, to execute the matrix multiplication described in Table 2B. The future represents data that will be present at some point in the future and hence is a proxy for synchronizing the asynchronous tasks.

TABLE 2C

```
void matixMul(
   int size,
   Pointer<double> inputA,
   Pointer<double> inputB,
   Pointer<double> output)
{
   Task<void, Index<2>> matMul(
      [inputA,inputB,output]
         (Index<2> index) ___device(hpp) {
         unsigned int i = index.getX( );
         unsigned int j = index.getY( );
         double sum = 0;
         for (unsigned int k = 0; k < size; ++k) {
            double a = inputA[i * size + k];
            double b = inputB[k * size + j];
            sum += a * b;
         }
         output[i * size + j] = sum;
      });
   Future<void> future = matMul.enqueue(
      Range<2>(size, size));
   future.wait( );
}
```

3. Tasks

In one example, HPP programming model provides asynchronous tasks that execute on the grid. The difference between HPP tasks and the conventional OpenCL tasks is that HPP tasks encode the behavior of an asynchronous agent that can execute like a ConcRT style task or an OpenCL-style dispatch.

Table 3A below includes example pseudo code that defines an HPP task as a template class.

TABLE 3A

```
template<
   typename ReturnType_,
   typename IndexType_ >
class Task
{
public:
   typedef std::vector<ReturnType_> ReturnDataType;
   template< typename FunctionType >
   Task( FunctionType f );
   template<
      typename T_,
      typename RangeType_ >
   auto enqueue(
      RangeType_ r,
      Future<T_> )
   -> Future<ReturnDataType_>;
};
```

In one example, as HPP is an asynchronous tasking model, a developer configures inter-task dependencies. The Future<T> type controls dependencies by encapsulating an initially unknown result that will become available at some later point in the future, as demonstrated in an example in Table 2C, above. Waiting on or assigning from a future waits on completion and gives access to the now-available value.

Table 3B is an example source code that shows execution of two tasks. The functionality of the two tasks, f1 and f2 is elided for space, and represented as ( . . . ). The futures of tasks f1 and f2 are combined into a single future task f3, that is waited upon, which is implemented by an f3, that is waited upon which is implemented by an f3.wait( )function.

TABLE 3B

```
Future<int> f1 = Task<int>(...).enqueue(...);
Future<float> f2 = Task<float>(...).enqueue(...);
auto f3 = f1 && f2;
f3.wait( );
```

4. Distributed Arrays

The memory hierarchy of modern computer architectures is complex and explicitly or implicitly exposes different memory levels and localities. An example of explicitly managed scratch pad memory structure is the memory visible in a conventional OpenCL programming model. Another example is an SMP Symmetric Multiprocessing System that has similar properties, such as a NUMA Non-Uniform Memory Access locality. However, without knowledge of cache layout, false sharing is an issue for multithreaded applications.

A class of programming languages called partitioned global address space (PGAS) assumes a single global address space that can be logically partitioned into regions. Each region may be allocated to a particular local processor. In PGAS a window is mapped over parts of the global memory creating local memory regions. Explicit loads and stores move data in and out of those local memory regions. Global memory provides a shared and coherent view of all memory, while scratch pad memories provide "local" disjoint views, internally shared and coherent, on to subsets of the global view.

In practice, devices have multiple memories. Example memories are cache memories and on chip global memories. Distributed arrays in HPP programming model generalize the multiple memories into a PGAS abstraction of persistent user managed memory regions. The regions sub-divide memory (i.e., a single unified global memory or regions themselves). Visibility of the memory regions, i.e., memory sharing and coherence, is defined with respect to a region node and its ancestors.

Figure 2:
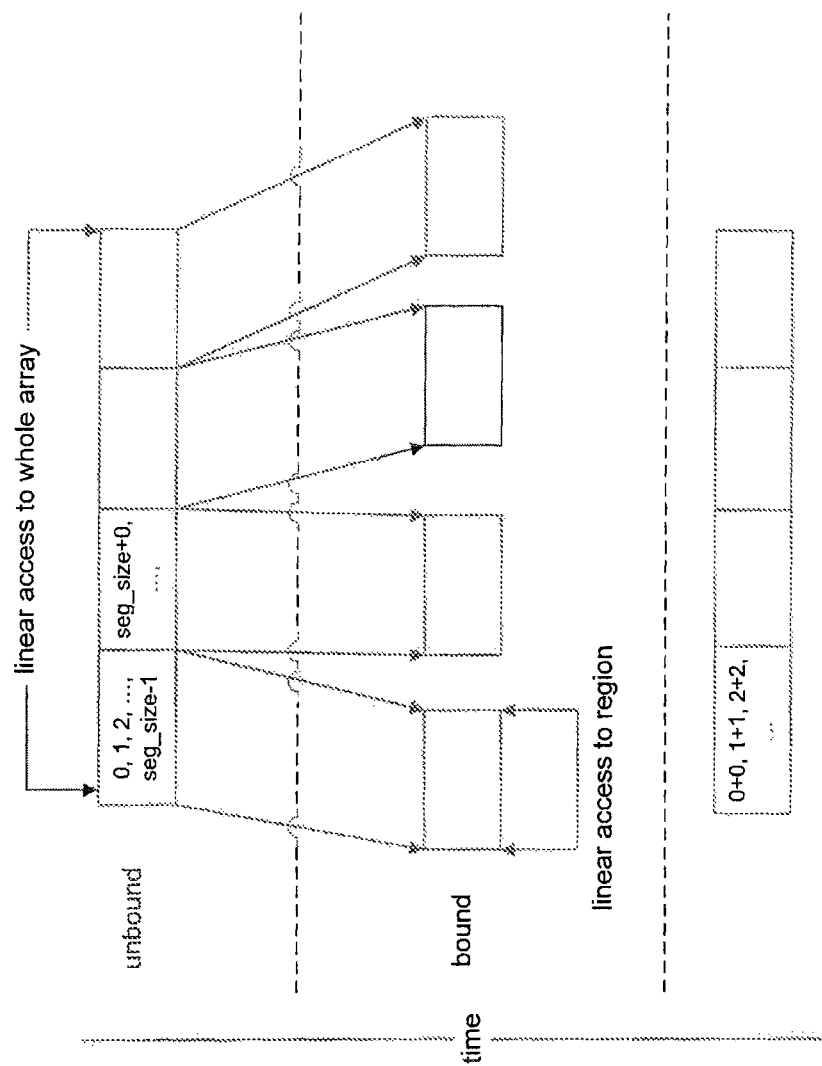
FIG. 2 is a block diagram that shows bound and unbound distributed arrays access, according to an embodiment.

One example use case is to abstractly manage OpenCL's workgroup local memory, as shown in FIG. 2, and described in detail below. However, the invention is not limited to this embodiment.

In an embodiment, distributed arrays are defined in terms of regions and segments. Regions are accessible entities that may be placed into memory and accessed. A region defines a memory visibility constraint as a layer in hierarchy. Segments are leaf memory allocations. Leafs are created by distributing a region across a set of nodes in the execution graph. A region may be divided into segments based on the number of subtasks created at the appropriate level of the hierarchy. Unlike a conventional global memory, distributed arrays that are bound to executions are segmented. A bound segment can be accessed from a particular workgroup, but may or may not be accessed by other workgroups.

FIG. 2 is a block diagram 200 that shows memory management using distributed arrays, according to an embodiment of the present invention.

Table 4A below includes example pseudo code that defines a distributed array as a template class.

TABLE 4A

```
template<
    typename T = void
    bool Persistent = true,
    template <class Type_> AccessPattern_ =
        ScatterGather>
DistArray
{
    ...
}
```

When an instance of distributed array is created, the distributed array is unbound, as illustrated by an unbound distributed array in FIG. 2. Once created, abstract regions and sub-regions in unbound distributed array may be allocated.

When the unbound array is passed to a kernel it becomes a bound array, as illustrated by bound distributed array in FIG. 2. In an embodiment, the pseudo code for binding unbound distributed array and matching it with a corresponding kernel argument is in Table 4B below:

TABLE 4B

```
template<
    typename T = void
    template <class Type_> AccessPattern_> =
        ScatterGather>
BoundDistArray
{
    ...
    getRegion(Region<T_>);
};
```

Once the bound distributed array is within a kernel, a specific region within bound distributed array can be accessed, using a getRegion( ) function. The getRegion( ) function returns a region in bound distributed array. The example pseudo code for the returned region is show in Table 4C below.

TABLE 4C

```
template <
typename T_,
template<typename Type_> class AccessPattern_ =
StructuredArrayAccess>
class Region : public AccessPattern_<Type_>
{
    ...
    size_t getRegionSize( );
};
```

In the example pseudo code in Table 4C, a region's access interface is defined by the parameter AccessPattern. For example, StructuredArrayAccess defines a Fortran array style interface exposing an array class (designated as [ ] in Fortran), along with its members to support array slicing and transformations.

Example pseudo code for using distributed arrays is shown in FIG. 4D below.

TABLE 4D

```
DistArray<float> darray;
Region<float> region;
region = darray.allocRegion(darray.getMaxRegionSize( ));
parallelFor(
    Range<1,1>(
    darray.getTotalSize( ),
        Range<1>(region.getSize( ))),
    darray,
    [region] (
        Index<1> i,
        BoundDistArray<float> a) __device(hpp) {
        a(region)[index.getLocalX( )] += index.getX( );
});
```

In this example, a single region in the distributed array is allocated using darray.allocRegion(darray.getMaxRegionSize( )) function. Once allocated, the region is bound in the execution of the kernel, using a _device(hpp) function included in pseudo code in Table 4D. The region is accessed within the kernel using the local workgroup ID index for each workitem. This example highlights a key feature of distributed arrays in the HPP programming model. Namely, because coherence is described in terms of ancestors, it is safe to allocate an independent region to each workgroup.

In an embodiment, the memory implementation moves regions into on-chip scratch pad memories on the GPU on demand. The memory implementation also performs cache memory prefetching on the CPU. In an embodiment, the memory implementation also moves regions, depending on location in the region tree, into scratch pad memories, or moves a family of regions whose access is known to be limited to a particular CPU or GPU.

5. Channels

Although GPU cores may be used for general purpose computing, GPUs are primarily used to processing graphics workloads. In an embodiment, graphics workloads are dataflow pipes. For example, graphics workload may include hull shading, tessellation and domain shading which can be implemented as a pipe that amplifies or consumes work at each stage. The hull shader specifies tessellation factors for edges of a triangle such that the tessellator might divide that triangle into many other triangles. An example use case may be varying the viewing of an object based on the distance from the camera—the closer the distance to the viewer, more detail being needed near the viewer.

The conventional hardware scheduling and memory buffers may efficiently handle these workloads and are optimized for maintaining a high level of utilization. The hardware scheduler schedules just enough work for a GPU at each stage to keep the pipeline busy without starvation. However, conventional programming models for GPUs do not have such capability.

As the hardware is designed to manage pipelines of this sort, HPP programming model exposes this feature to the developer. To this end HPP programming model adopted the concept of communication channels and applied it to dynamic scheduling systems. Given the massively data-parallel nature of GPU dispatches the usual approach is that the hardware scheduler will issue more work as resources become available. It is this approach HPP programming model maintains through channels, such that rather than utilizing blocking reads the consumer is created at the point of read in a fine-grained fashion. A similar approach is used in various CPU task-oriented runtime systems such as the agents library that runs on top of Microsoft's concurrency runtime.

Figure 3:
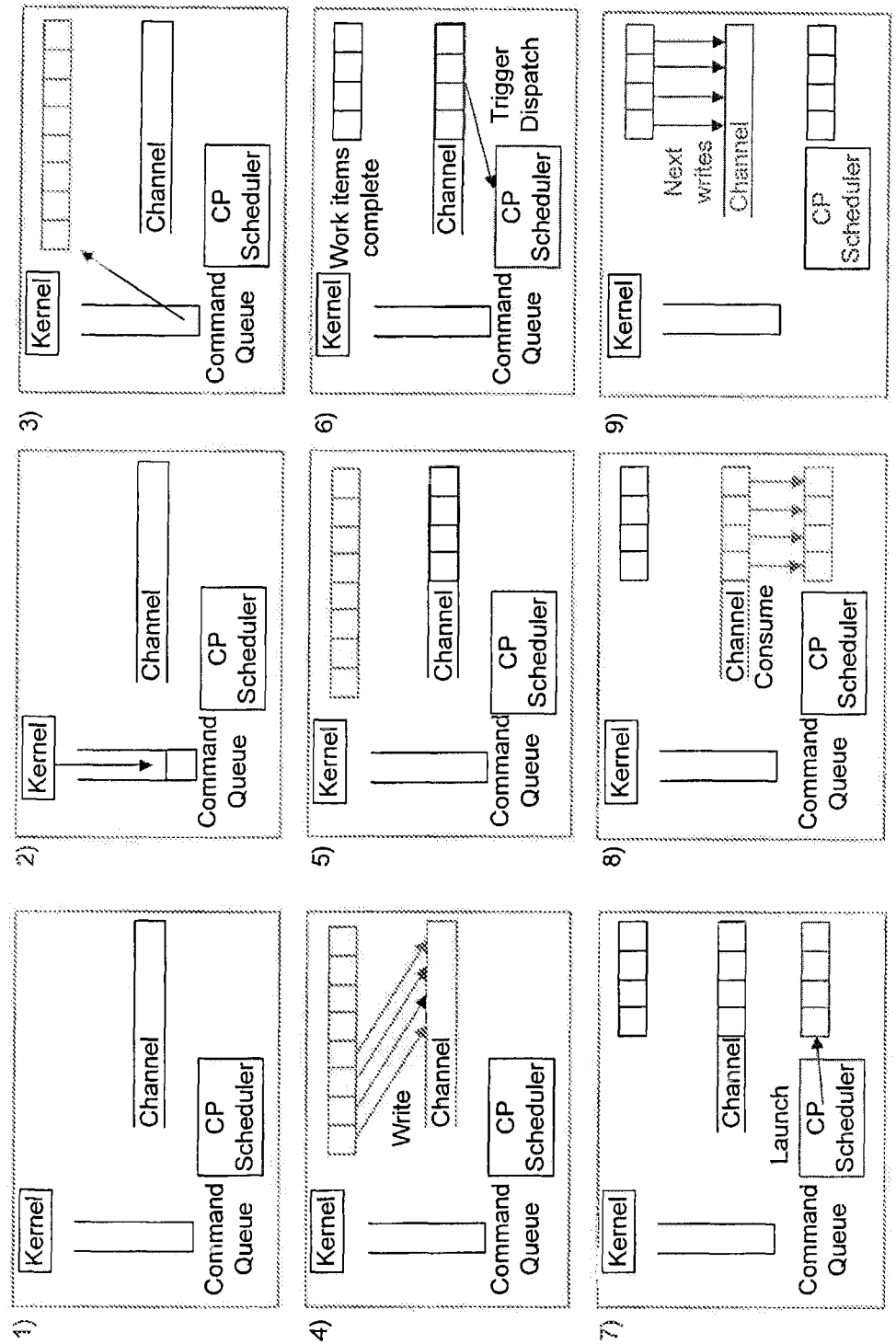
FIG. 3 is a block diagram of a channel usage flow, according to an embodiment.

FIG. 3 is a block diagram 300 of a flowchart for a data-flow in a channel, according to an embodiment of the present invention. In block 1, the basic structure of a kernel, command queue, channel and scheduling hardware (control processor) is displayed. In block 2 the kernel is enqueued, and launches workitems in block 3. The launched workitems write into the channel in block 4. The written data is displayed in the work channel in block 5. The control processor detects a launch condition for the channel in block 6 and launches consumer workitems in 7. Consumer workitems consume the contents of the channel in block 8. At block 9, the process continues as the next set of workitems is written into the channel.

The implementation approach differs from a conventional approach that exposes fixed-function and programmable processing stages that are linked via data queues. However, the conventional approach fails to describe coordination language and scheduling of the HPP programming model.

The channel interface may be defined by the pseudo code in Table 5A below, according to one embodiment.

TABLE 5A

```
template<class T_>
class Channel
{
public:
    Channel(size_t);
    template<typename F_>
    void executeWith(
        Coordinator const& coord,
        Range<1> r,
        F_ f);
    size_t size( );
    void write(const T_& v);
};
```

The executeWith( ) method in Table 5A associates a coordinator predicate that returns true if the corresponding consumer kernel should be dispatched. Additionally, the channel write( ) method blocks if the channel is full, thus allowing consumers to reduce the amount of data stored in the channel before continuing. In the HPP programming platform, channel data store are locked into on-chip cache and thus are limited in size. An advantage is that good data between producer/consumer can be locally seen.

In an embodiment, coordinators are control programs describing when to trigger consumers, as described above. They are expressed as a restricted domain specific language, embedded into C++.

The following example in Table 5B, for calculating a global reduction ties together the distributed arrays and channels. For simplicity the example assumes that the input size is a multiple of MVECTOR_SIZE variable. A single distributed array is used with two disjoint regions. A single channel is used to store the results of each work-group's reduction, with a trigger executing a second kernel to reduce the resulting channel data, once full.

TABLE 5B

```
int channelSize = 32;
vector<int> input = ... ;
Channel<int> results(channelSize);
DistArray<int> darray;
Region<float> region1; // used in the 1st pass
Region<float> region2; // used in the 2nd pass
Region<float> ;
region1 = darray.allocRegion(MVECTOR_SIZE);
region2 = darray.allocRegion(channelSize);
int result;
results.executeWith(
    [=] (Channel<int>* c) -> bool ___device(coord) {
        return c->size( ) == numWorkGroups;
    },
    Range<1,1>(channelSize, channelSize), darray, [&result, region2] (
        Index<1,1> index,
        BoundDistArray<float> a)
        vector<int> v) ___device(hpp) {
            int accumulator = 0;
            int id = index.getLocalX( );
            Segment<float> seg = a(region);
            seg[id] = v[id];
            seg.barrier( );
            for(int offset = get_local_size(0) / 2; offset > 0;  offset = offset / 2)
            {
                if (id < offset) {
                    int other = seg[id + offset];
                    int mine = seg[id];
                    seg[id] = mine + other;
                }
                seg.barrier( );
            }
            if (id == 0) {
                *result = seq[0];
            }
        }});
parallelFor( Range<1,1>(input.size( ), MVECTOR-SIZE), darray
[&results, input] (
    Index<1,1> index,
    BoundDistArray<float> a) ___device(hpp) {
    // parallel reduce kernel body here
}});
```

The example in Table 5B demonstrates the use of distributed array for localized communication, and the use of channels for global communication, in the HPP programming model.

6. Barriers

Coordinating shared data is critical in the development of parallel programs that scale. The conventional GPGPU solutions limit the synchronization via barrier operations to memory consistency and workitems reaching the same PC. The conventional GPGPU solutions are also limited to cases that do not include divergent control flow, or cases that do include the divergent control flow that guarantee that all workitems enter a conditional branch if any one workitem enters the conditional branch.

HPP addresses these limitations by introducing barriers that can be used in a control flow and can be used across work groups.

The source code in Table 6A below defines the barrier class and the relevant methods, in one embodiment.

TABLE 6A

```
class Barrier
{
public:
    Barrier(size_t count);
    void skip( );
    void wait( );
    void arrive( );
};
```

In the example above, a barrier is initialized with a count that represents the number of participants in the barrier. In one embodiment, the participants may be workitems. The barrier class also includes skip( ), wait( ) and arrive( ) methods.

The wait( ) method blocks any workitem that performs the wait( ) method from continuing execution until the other participants (i.e., workitems) have also taken part. In an embodiment, the wait( ) method may be performed by a consumer.

The arrive( ) method may be performed by a workitem that participates in the barrier, but does not wait for other workitems. In an embodiment, the arrive( ) method may be performed by a producer.

The skip( ) method may be performed by a workitem that withdraws from further participation in the barrier. The withdrawn workitem does not count against the other participants that have executed a waiting method. In an embodiment, the skip( ) method may be used by a workitem who has left the execution loop, such that the remaining workitems may continue synchronizing on the barrier after the workitem leaves.

The methods above allow for the use of barriers in a control flow. For example, workitems that enter the else or exit branch in the control flow, can call the skip( ) method and be removed from execution. The remaining workitems can then continue iterating and communicating through scratch memory and wait on the barrier.

The example source code for using barriers in a control flow is shown in Table 6B:

TABLE 6B

```
Barrier b(8);
parallelFor(Range<1>, [&b, scratch] (Index<1> i) {
    scratch[i.getX( )] = i.getX( );
    if( i.getX( ) < 4 ) {
        for( int j = 0; j < i.getX( ); ++j ) {
            b.wait( );
            x[i.getX( )] += scratch[j+1];
        }
        b.skip( );
    } else {
        b.skip( );
        x[i.getX( )] = 17;
    }
});
```

By passing barrier objects to functions and skipping elsewhere those functions are safe to synchronize on the barrier without dependencies on external workitems. For example, consider the function in Table 6C, below:

TABLE 6C

```
void someOpaqueLibraryFunction(const int i, Barrier &b);
    Barrier b(8);
    parallelFor(Range<1>, [&b, scratch] (Index<1> i) {
        scratch[i] = val;
        if( i.getX( ) < 4 ) {
```

TABLE 6C-continued

```
            someOpaqueLibraryFunction(i, b);
        } else {
            b.skip( );
            x[i.getX( )] = 17;
        }
    });
```

In addition to using barrier objects in the control flow, HPP programming model controls the use of barriers to maintain proper execution of a workgroup. For example, replacing the call to a skip( ) method in the else branch, in Table 6C, with wait( ) may be invalid. For example, it may not be possible to know the number of times someOpaqueLibraryFunction( ) may use the barrier. However, instead of replacing a skip( ) method with a wait( ) method, two barriers may be used in the HPP programming model. The embodiment, is shown as Table 6D below:

TABLE 6D

```
Barrier b(8);
Barrier b2(8);
parallelFor(Range<1>, [&b, &b2, scratch] (Index<1> i) {
    scratch[i] = val;
    if( i < 4 ) {
        someOpaqueLibraryFunction(i, b);
        b2.wait( );
    } else {
        b.skip( );
        b2.wait( );
        x[i] = 17;
    }
});
```

In an embodiment, barrier objects may also be used to synchronize dependent kernels. For example, the host may delegate to multiple GPU devices to process the function, as shown in Table 6E below:

TABLE 6E

```
for(...) {
    parallelFor(Range<1>(N), foo);
}
```

In Table 6E, implicit synchronization occurs following each invocation of the parallelFor( ) function, with an intention of pushing the "for loop" on to a respective GPU. The goal is to reduce the cost of synchronization between the host and device, as shown in Table 6G, below:

TABLE 6G

```
void foo(Index<1> index, ...) ___device(hpp)
{
    for(...) {
        foo(index, ...);
        ___gpu_sync( );
    }
}
```

In Table 6G, the function _gpu_sync( ) is an inter workgroup barrier operation.

In an embodiment, the cross work-group variant of HPP's barrier may be implemented using the Global Data Share (GDS) in AMD's HD7970, GPU. GDS is a 64K on chip global memory with barrier functionality across the whole device. Additionally the _gpu_sync( ) function may be implemented using the algorithm described above.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for improving memory utilization in a heterogeneous computing platform, the method comprising:
   generating an unbound distributed array in a plurality of memories of different types included in the heterogeneous computing platform, wherein the unbound distributed array permits linear access to an entirety of the unbound distributed array;
   binding the unbound distributed array to a kernel to form a bound array, wherein the kernel is configured to execute a plurality of workgroups on processors that are included in the heterogeneous computing platform;
   segmenting the bound array to form a plurality of bound segments, wherein a particular bound segment is accessible by a particular workgroup and inaccessible by other workgroups in the plurality of workgroups;
   accessing the plurality of bound segments when the kernel executes the plurality of workgroups;
   generalizing the plurality of memories of different types into a partitioned global address space (PGAS) abstraction; and
   receiving an indication from the kernel for managing a region in the PGAS abstraction.

2. The method of claim 1, wherein the plurality of memories includes a global chip memory.

3. The method of claim 1, wherein the plurality of memories include a cache memory.

4. The method of claim 1, wherein the segmenting includes:
   allocating the bound array to a plurality of regions to form a plurality of bound regions, wherein each respective bound region permits linear access to an entirety of the each respective bound region and
   forming the plurality of bound segments by allocating the plurality of bound regions.

5. The method of claim 4, wherein a particular region among the plurality of bound regions is accessed using a workgroup ID index associated with a respective workgroup.

6. The method of claim 5, wherein each of the plurality of workgroups includes a plurality of workitems, and the workgroup ID index identifies a workitem in the plurality of workitems.

7. The method of claim 4, further comprising moving one or more of the plurality of bound regions to a scratch pad memory on a graphics processing unit (GPU) device based on the plurality of workgroups.

8. The method of claim 1, further comprising performing a cache memory prefetching for the unbound distributed array on a central processing unit (CPU).

9. A system that improves memory utilization in a heterogeneous computing platform, the system comprising:
   a plurality of memories of different types;
   a plurality of processors that each communicatively coupled to one or more memories in the plurality of memories; and
   a heterogeneous parallel primitives (HPP) platform configured to:
   generate an unbound distributed array in the plurality of memories, wherein the unbound distributed array permits linear access to an entirety of the unbound distributed array;
   bind the unbound distributed array to a kernel to form a bound array, wherein the kernel is configured to execute a plurality of workgroups on the plurality of processors;
   segment the bound array to form a plurality of bound segments, wherein a particular bound segment is accessible by a particular workgroup and inaccessible by other workgroups in the plurality of workgroups;
   access the plurality of bound segments when the kernel executes the plurality of workgroups;
   generalize the plurality of memories of different types into a partitioned global address space (PGAS) abstraction; and
   receive an indication from the kernel for managing a region in the PGAS abstraction.

10. The system of claim 9, wherein the plurality of memories includes a global chip memory.

11. The system of claim 9, wherein the memory includes a cache memory.

12. The system of claim 9, wherein the plurality of bound segments are formed by:
   allocating the bound array to a plurality of regions to form a plurality of bound regions, wherein each respective bound region permits linear access to an entirety of the each respective bound region; and
   forming the plurality of bound segments by allocating the plurality of bound regions.

13. The system of claim 12, wherein a particular region among the plurality of bound regions is accessed using a workgroup ID index associated with a respective workgroup.

14. The system of claim 13, wherein each of the workgroups include a plurality of workitems, and the workgroup ID index identifies a workitem in the plurality of workitems.

15. The system of claim 12, wherein the HPP platform is further configured to move one or more of the plurality of bound regions to a scratch pad memory on a graphics processing unit (GPU) device based on the plurality of workgroups.

16. The system of claim 9, wherein the HPP platform is further configured to perform a cache memory prefetching for the unbound distributed array on a central processing unit (CPU).

* * * * *